UNITED STATES PATENT OFFICE 2,506,068

PRODUCTION OF FLUOROACETIC ACIDS

John W. C. Crawford, Welwyn Garden City, and Eric R. Wallsgrove, Leamington Spa, England, assignors to Imperial Chemical Industries Limited, a corporation of Great Britain No Drawing. Application February 10, 1948, Serial No. 7,527. In Great Britain, February 17, 1947

11 Claims. (Cl. 260—539)

This invention relates to the production of fluoroacetic acids, esters and salts thereof and more particularly to the production of di- and trifluoroacetic acids and esters and salts thereof.

British Patent No. 577,481 describes a process for the production of fluoroacetic acids and alkali metal salts thereof comprising reacting fluoroethylenic compounds of the type $$CF_2XCY=CYZ$$

in which Y and Z are hydrogen or chlorine and X is hydrogen, fluorine or chlorine, with an alkali metal permanganate in alkaline medium. This process suffers from the disadvantage that it cannot be accomplished satisfactorily in stainless steel pots as these pots are attacked by hot alkaline permanganate solutions. It cannot be accomplished in enamel-lined pots, e. g. Pfaudler pots, either, if strong caustic alkali solutions are used as these solutions attack the linings of these pots. If, however, the reaction is accomplished in the presence of a small amount of alkali, carbon dioxide is liberated during the reaction and this carries some fluoroacetic acid from the reaction mixture and processing complications or loss of yield result.

It has also been proposed to produce trifluoroacetic acid by the chromic acid oxidation of m-aminobenzotrifluoride. This latter process, however, has the disadvantage of being slow, costly, giving only yields of the order of 55-60%, and presenting major corrosion problems.

An object of this invention is to provide means for the production of fluoroacetic acids, esters and salts thereof by a process suitable for use in enamel lined vessels. Another object is to provide an economic means for the production of fluoroacetic acids, esters and salts thereof. A further object is to provide means for the production of fluoroacetic acids, esters and salts thereof by a process giving greater yields and taking less time than heretofore. Other objects will appear hereinafter.

According to the present invention these objects are accomplished by a process comprising the step of reacting a fluoroethylenic compound of the type $CF_2XCY=CYZ$ in which X is hydrogen, fluorine or chlorine, Y is hydrogen or chlorine, and Z is hydrogen, chlorine or $CF_2X$, with an aqueous permanganate solution in the presence of sufficient calcium and/or magnesium oxide or hydroxide to combine with all acids liberated by the reaction. These reaction mixtures have a low alkalinity and the enamelled glass-lined vessels are not attacked, as is the case where the necessary alkali is provided by the alkali metal hydroxides. Fluoroacetic acids may be obtained by acidifying mixtures obtained after this reaction (or fractions of these mixtures).

Fluoroethylenic compounds in which Z is $CF_2X$ are particularly preferred as these give a yield per mol of permanganate twice that of the other fluoroethylenic compounds used as starting materials in the process of this invention.

Suitable starting materials which may be used in carrying out the process of our invention include 3,3,3-trifluoro-1,1,2, trichloro-propene-1 $CF_3$—$CCl=CCl_2$, 3,3-difluoro-1,1,2,3-tetrachloro-propene-1, $CClF_2$—$CCl=CCl_2$ and 1,1,1,4,4,4-hexafluoro-2,3-dichloro-butadiene-2, $$CF_3—CCl=CCl—CF_3$$

Calcium hydroxide is preferred on account of its availability and cost and because, if any permanganate remains in the reaction mixture at the completion of the reaction, this is destroyed easily by passing sulphur dioxide, manganese dioxide and calcium sulphate being precipitated from solutions containing calcium hydroxide.

Any salts of permanganic acid may be used in the process of this invention. Potassium permanganate is preferred as it is available and cheap. The use of calcium permanganate in conjunction with calcium hydroxide and with the use of sulphur dioxide to destroy the excess permanganate gives solutions of salts of fluoroacetic acids which are contaminated only with calcium chloride.

The permanganate salt may be used in the theoretical amount or in slight excess and may be, for example in the form of a 5% to 25% aqueous solution and of these the more concentrated solutions are preferred because less water has to be removed subsequently.

In general, temperatures of the order of 70° C. to 80° C. are satisfactory for carrying out the process of this invention although a wider range of temperatures may be employed, for example, temperatures ranging from 20° C. to 130° C. In general, the process may be carried out at atmospheric pressure, although higher or lower pressures may be employed if desired. When temperatures above 100° C. are employed, pressure vessels may be used, and the permanganate and alkali may be added simultaneously and slowly to the higher boiling organic start-materials. An alternative procedure which is preferable in some cases is to add the organic compound to an agitated solution containing permanganate and alkali.

In one form of the invention the fluoroethylenic compound is charged into a reaction vessel, with water, calcium or potassium permanganate and sufficient lime to ensure that the reaction mixture remains alkaline throughout the reaction. The mixture is heated with agitation, the temperature being raised sufficiently to produce smooth reaction.

When the reaction has been completed any unreacted fluoroethylenic compound may be distilled off. If there is present excess of permanganate, it may be destroyed by reaction with a reagent such as sulphur dioxide, hydrogen peroxide, sodium sulphite, sodium bisulphite or sodium hydrosulphite. The salt of the fluoroacetic acid may be isolated admixed with calcium chloride and potassium chloride, if potassium permanganate is used, from the reaction mixture by filtration to remove manganese dioxide, calcium sulphate, calcium carbonate and any unreacted lime, and evaporation to dryness. An alternative method of isolating salts other than those of the alkaline earth metals is to treat the reaction mixture with a water-soluble carbonate, such as sodium or potassium carbonate, and filter off the solution of the crude salt from precipitated calcium carbonate. If desired, the filtered reaction mixture may be treated with the theoretical amount of an excess of sulphuric acid to set free the fluoroacetic acid, the aqueous fluoroacetic acid distilled off, neutralised with sodium carbonate and dried as the sodium salt, which may be mixed with the theoretical amount or an excess of sulphuric acid (suitably of 93% to 100% strength), and the fluoroacetic acid recovered by distillation.

Alternatively the acid may be obtained from the neutralised reaction mixture, which may have been treated with a soluble carbonate, if desired, by evaporation followed by extraction of the fluoroacetates with an organic solvent, evaporation of the organic solvent, treatment with the theoretical quantity or an excess of sulphuric acid and distillation of the pure fluoroacetic acid. Any organic solvent which is inert to the ingredients of the reaction mass and which dissolves the desired product but not the undesired products such as the halide salts, may be used. Examples of satisfactory solvents are methyl alcohol, ethyl alcohol, isopropyl alcohol, secondary butyl alcohol, diethyl ether, acetone, dioxane and ethyl acetate.

Esters are prepared from the salts and acids produced by the process of this invention by any of the conventional methods for example direct esterification, ester interchange and the like. Thus in one method of preparing esters of any excess of permanganate in the oxidised reaction mixture is destroyed, the precipitated manganese dioxide filtered off and the filtrate evaporated to dryness, sulphuric acid and the alcohol to be esterified added and the ester recovered by distillation.

The following examples in which all parts are by weight, except where otherwise stated illustrate the process of this invention but it is to be understood that the invention is in no way limited by the examples.

*Example I*

|  | Parts |
|---|---|
| 3,3,3-trifluoro-1,1,2 trichloropropene-1 | 40 |
| Calcium hydroxide | 27 |
| Potassium permanganate | 46 |
| Water | 300 |

The potassium permanganate was dissolved in the water and fed into the reaction vessel together with the calcium oxide. The trichlorotrifluoropropene was added to the well-stirred solution at 65–70° C. over a period of 9 hours. After completion of the addition, the solution was gradually heated up to 95° C. until no further refluxing took place. After cooling, the solution was decolourised by addition of sodium bisulphite and the precipitated manganese dioxide, calcium sulphate and calcium carbonate were filtered off. The filtrate was treated with strong potassium carbonate solution until no more calcium carbonate was precipitated. After filtration, the solution was evaporated to dryness and extracted with methanol, giving 27 parts (89% yield) of potassium trifluoroacetate.

*Example II*

95 parts of trifluorotrichloropropene were oxidised as in Example 1.

136 parts of crude dry solid were obtained by evaporation. 47 parts of this solid were treated with 32 parts of concentrated sulphuric acid which was added gradually. When all the acid had been added, the mixture was heated and the trifluoroacetic acid distilled off as it was formed. The crude product was redistilled and 9 parts of trifluoroacetic acid, B. P. 71.5–72.5° C., containing less than 0.03% hydrochloric acid were obtained.

We claim:

1. A process for the production of potassium trifluoroacetate which comprises reacting trifluoro trichloro propene at a temperature of 65–70° C. at atmospheric pressure with an aqueous potassium permanganate solution of 5–25% concentration in the presence of sufficient calcium hydroxide to combine with all of the acids liberated during the reaction, cooling the reaction mixture, decolorizing the mixture by addition of sodium bisulfite, filtering the solution, treating the filtrate with potassium carbonate until calcium carbonate ceases to be precipitated, filtering the resulting mixture, evaporating the filtrate to dryness and extracting the dry mass with alcohol, whereby potassium trifluoroacetate is obtained.

2. A process for the production of a fluoroacetyl compound which comprises the step of reacting a fluoroethylenic compound from the group consisting of those having the general formulae:

$$CF_2XCY=CYZ \quad \text{and} \quad CF_2XYC=CYCF_2X$$

wherein X is a radical from the group consisting of hydrogen, fluorine and chlorine, and Y and Z are radicals from the group consisting of hydrogen and chlorine, with an aqueous metal permanganate solution, in the presence of an amount of a basic compound from the group consisting of calcium and magnesium oxide and hydroxide sufficient to combine with all the acids liberated during the reaction, and separating the resulting fluoroacetyl compound from the reaction mixture.

3. A process as claimed in claim 2 wherein the aqueous metal permanganate solution is of 5–25% by weight concentration.

4. A process as claimed in claim 2 wherein the permanganate solution is an aqueous potassium permanganate solution of 5–25% by weight concentration.

5. A process as claimed in claim 2 wherein said reaction is carried out at a temperature between 20 and 130° C.

6. A process as claimed in claim 5 wherein said reaction is carried out at a temperature of 70–80° C.

7. A process as claimed in claim 2 wherein said reaction is carried out at atmospheric pressure.

8. A process as claimed in claim 2 wherein said reaction is carried out under super-atmospheric pressure and at a temperature greater than 100° C.

9. A process as claimed in claim 2 wherein separation of the fluoroacetyl compound is accomplished by treating the reaction mixture with a soluble carbonate, filtering, evaporating the filtrate to dryness, extracting the fluoroacetates with an organic solvent and evaporating the solvent.

10. A process as claimed in claim 2 wherein the fluoroethylenic compound is selected from the group consisting of 3,3,3-trifluoro-1,1,2-trichloropropene-1; 3,3-difluoro-1,1,2,3-tetrachloro-propene-1 and 1,1,1,4,4,4-hexafluoro-2,3-dichlorobutene-2.

11. A process for the production of a metal salt of a fluoroacetic acid which comprises reacting a fluoroethylenic compound from the group consisting of those having the general formula:

$$CF_2XCY=CYZ \text{ and } CF_2XCY=CYCF_2X$$

wherein X is a radical from the group consisting of hydrogen, fluorine and chlorine, and Y and Z are radicals from the group consisting of hydrogen and chlorine, with an aqueous metal permanganate solution, in the presence of an amount of a basic compound from the group consisting of calcium and magnesium oxide and hydroxide required to combine with all the acids liberated during the reaction, and separating the resulting fluoroacetyl compound from the reaction mixture.

JOHN W. C. CRAWFORD.
ERIC R. WALLSGROVE.

REFERENCES CITED

The following references are of record in the file of this patent:

UNITED STATES PATENTS

| Number | Name | Date |
|---|---|---|
| 2,371,757 | Henne | Mar. 20, 1945 |
| 2,414,706 | Babcock et al. | Jan. 21, 1947 |

OTHER REFERENCES

Henne et al., J. Am. Chem. Soc., vol. 67, pp. 918–919 (1945).